June 5, 1928.
J. R. WOOD
MOLD MAKING MACHINE
Filed May 29, 1925
1,672,048
5 Sheets-Sheet 1
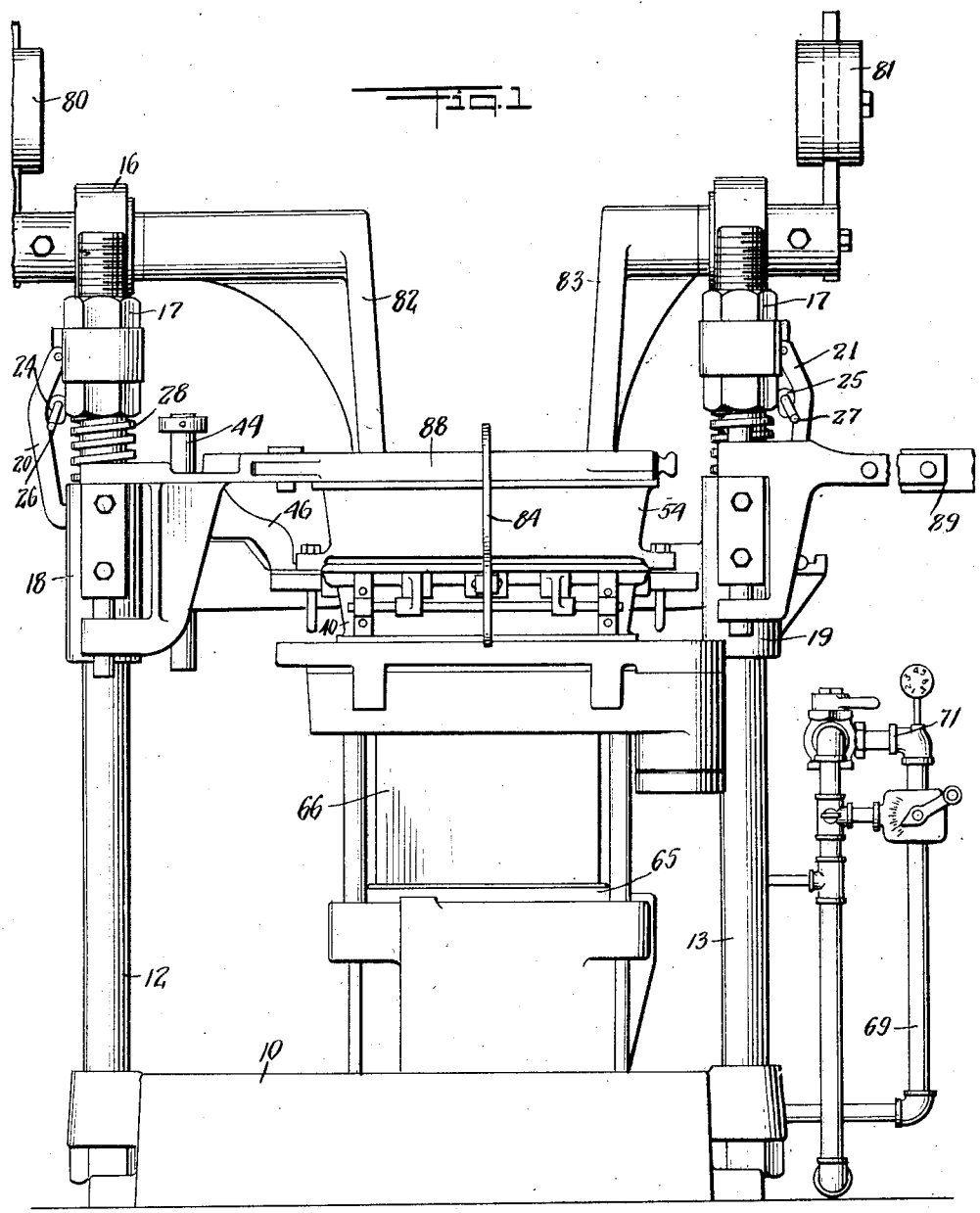
INVENTOR
John R. Wood
BY
Cooper, Kerr & Dunham
ATTORNEYS

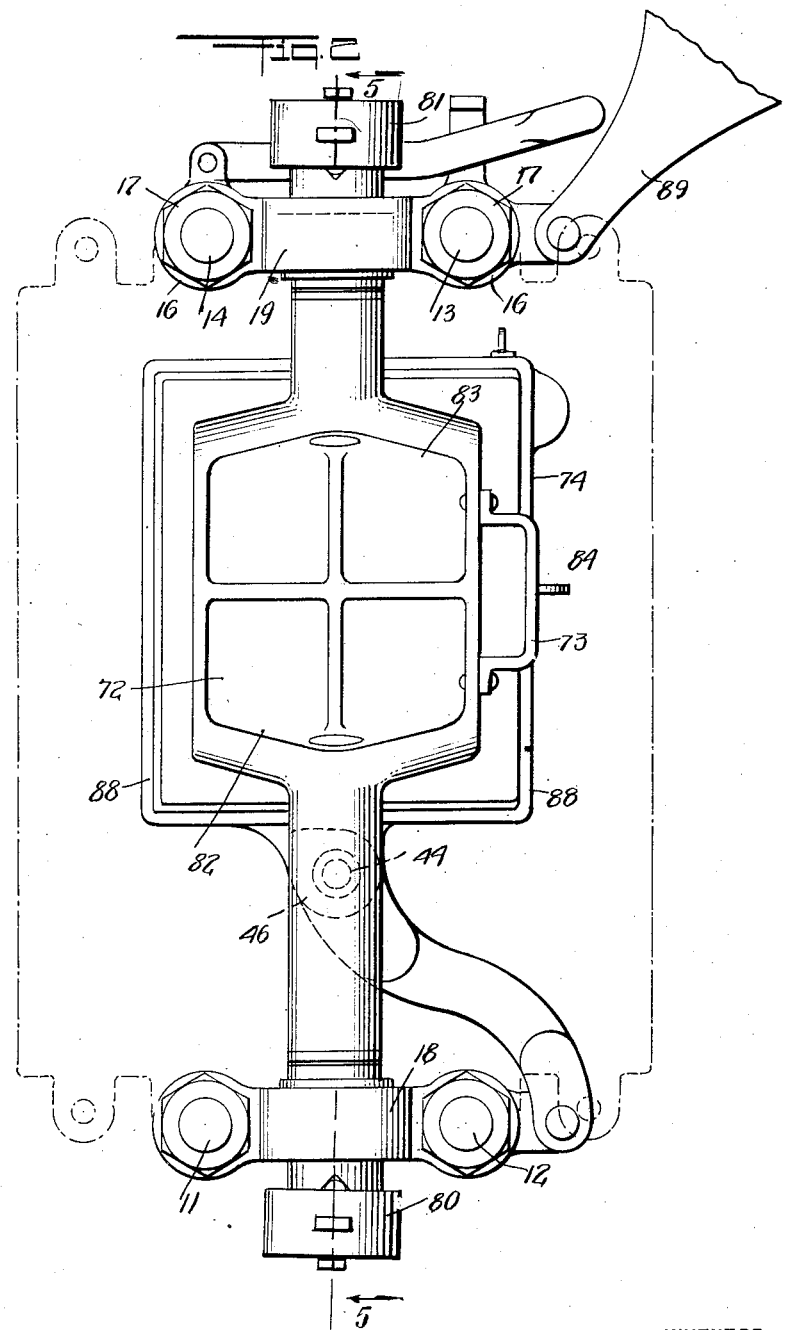

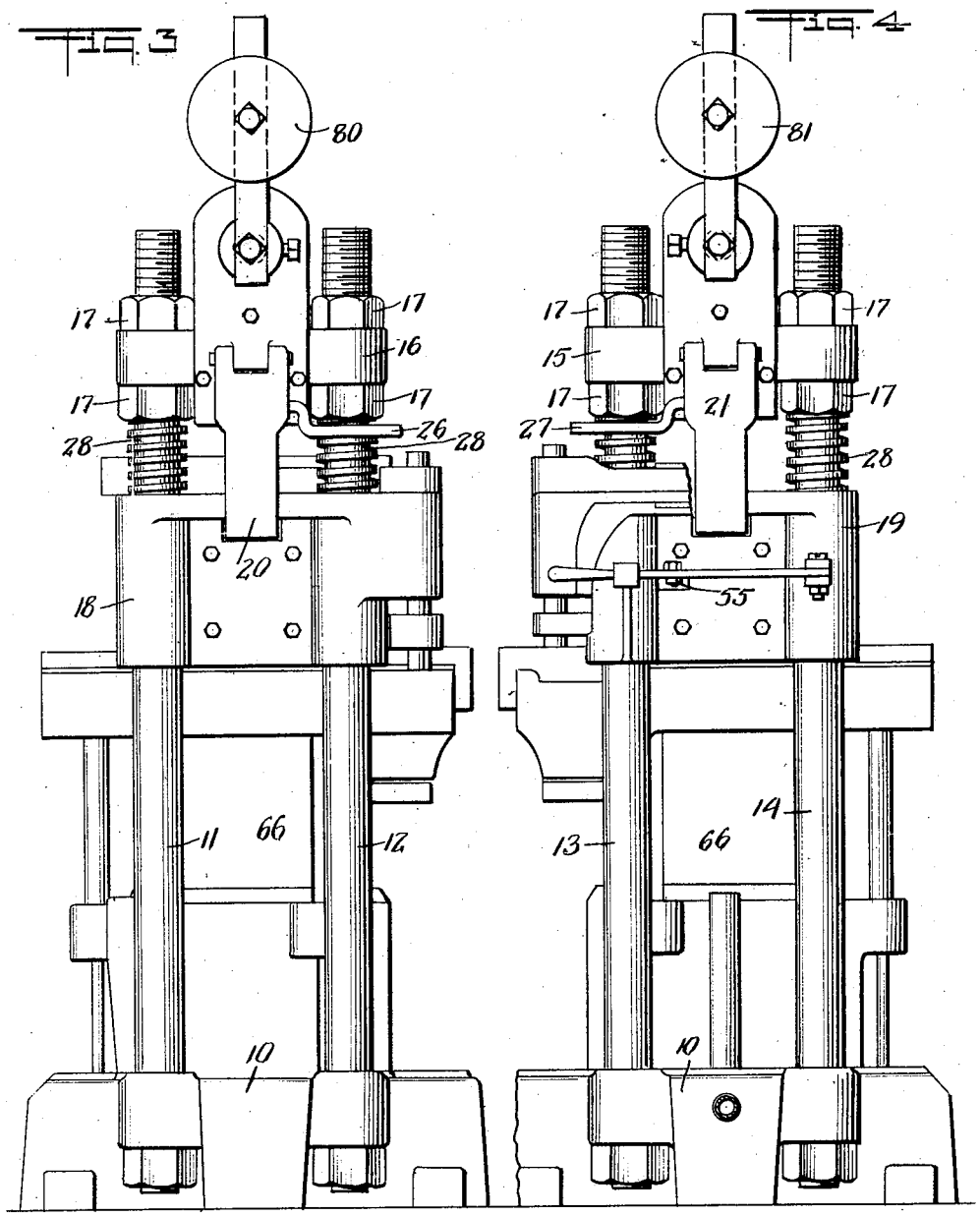

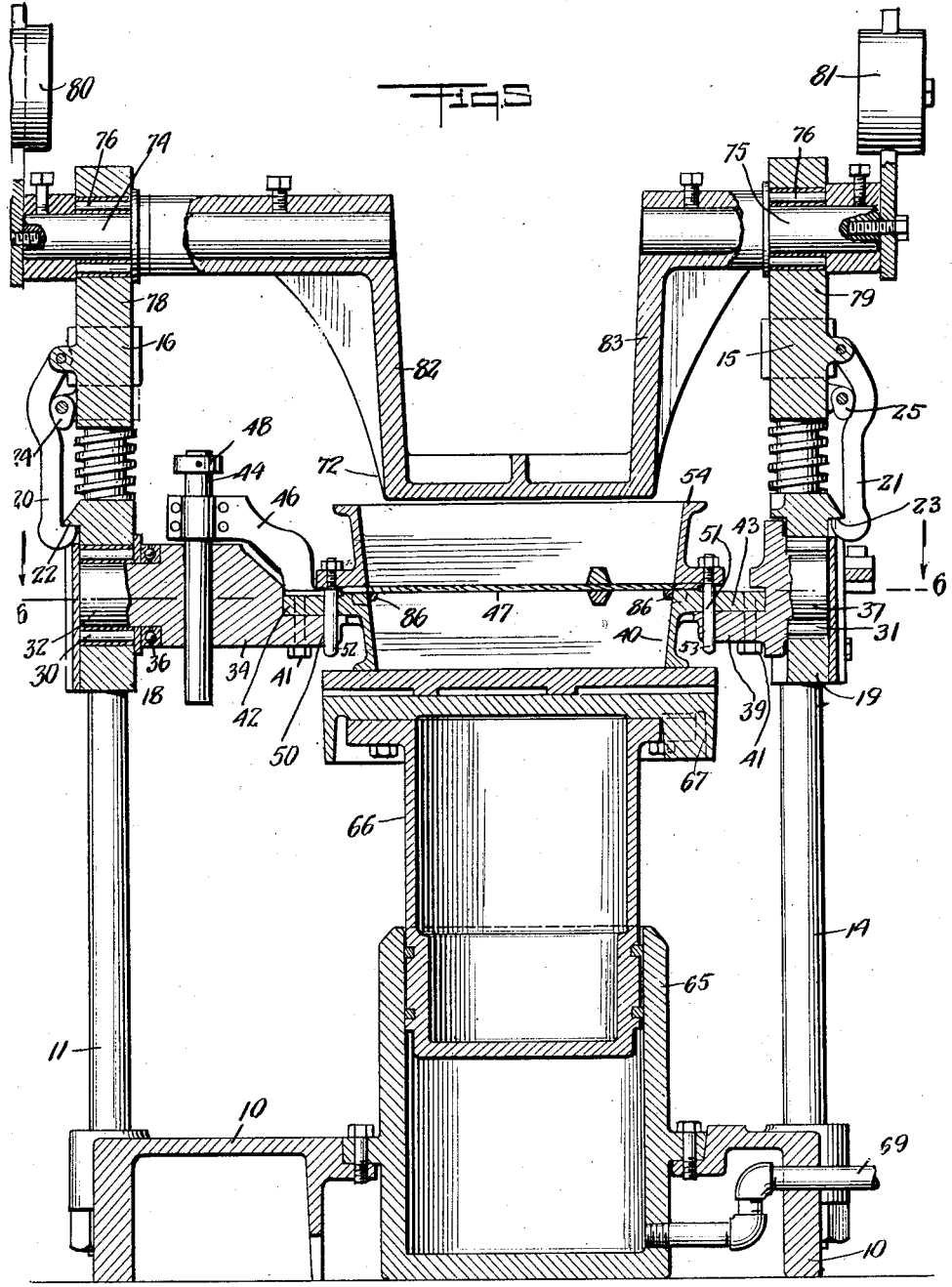

June 5, 1928.  
J. R. WOOD  
1,672,048  
MOLD MAKING MACHINE  
Filed May 29, 1925  
5 Sheets-Sheet 5
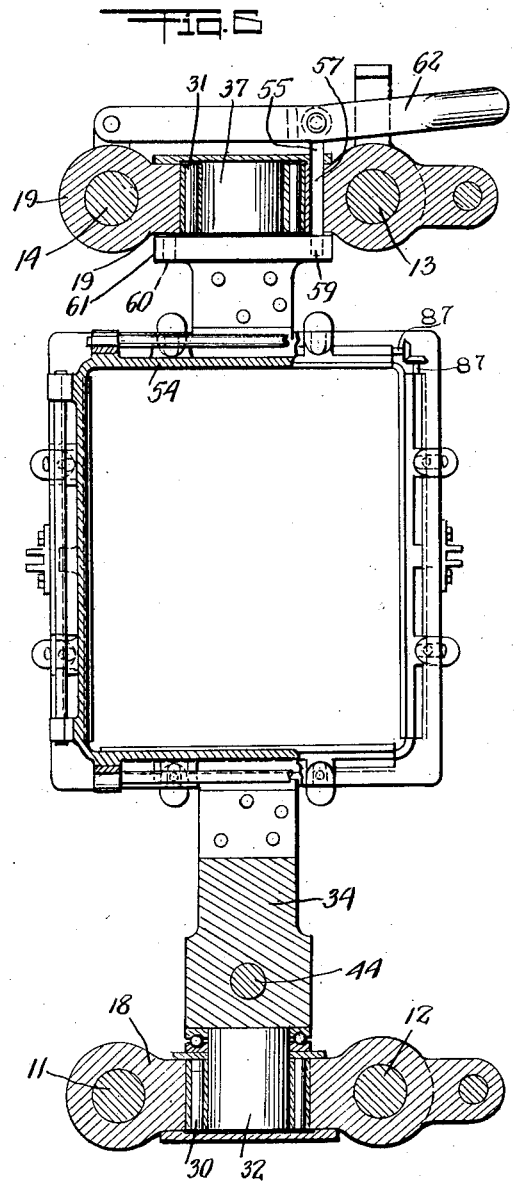

Patented June 5, 1928.

1,672,048

UNITED STATES PATENT OFFICE.

JOHN R. WOOD, OF HATBORO, PENNSYLVANIA, ASSIGNOR TO NEW PROCESS MULTI-CASTINGS COMPANY, OF NEWARK, NEW JERSEY, A CORPORATION OF NEW JERSEY.

MOLD-MAKING MACHINE.

Application filed May 29, 1925. Serial No. 33,604.

My present invention relates to a machine for the making of casting molds. It more particularly relates to such a machine which is adapted to squeeze and jolt the mold in the forming thereof and in which the mold is formed with the cope and drag mounted one on each side of a pattern plate which is stripped from the mold after first one part of the mold is formed and then the other, the flask being rolled over between the formation of the two parts of the mold therein.

In the machine of my invention the cope is preferably fixed to the machine and mounted over a squeezing and jolting table. Means are provided for swinging a pattern plate into and out of position over the cope and for positioning a drag on the pattern plate. A member for opposing the table during the mold squeezing is mounted for swinging into and out of the squeezing position. In this machine the squeezing or jolting table is used for moving the drag and mold during the assembly of the mold, the stripping of the pattern, and the stripping of the flask. A special valve is provided for admitting air pressure automatically to the table actuating means in such a manner that the mold is first squeezed and then jolted when such action is desired, this valve being described fully in my copending application Serial No. 85,869, filed February 4, 1926, to which reference is hereby made. When desired the table by proper operation of the valve may be given the squeezing or lifting movement alone.

In the drawings forming part of this application:

Fig. 1 is a vertical elevation of a machine embodying my invention showing a jolting and squeezing piston and cylinder; a valve for controlling the movement of the piston; a table on the upper end of the piston; a cope permanently mounted to the machine and resting on the table; connection between the machine and cope permitting of jolting, squeezing, and pattern and mold stripping movement of the latter; a pattern plate mounted to the cope support of the machine and movable into and out of the position on the cope; means for positioning a drag on the pattern plate and cope; means for rotating or rolling over the cope or flask; and a squeezing head movable into and out of operable relation with the flask and squeezing table, Fig. 2 is a plan view of the embodiment of Fig. 1, Fig. 3 is an end elevation view of Fig. 1 taken at the left hand side, Fig. 4 is an end elevation taken at the right hand side of Fig. 1, Fig. 5 is an elevation view in mid-section taken along the line 5—5 of Fig. 2 and looking in the direction of the arrows, and, Fig. 6 is a horizontal section view taken along the line 6—6 of Fig. 5.

In the drawings the base 10 supports the columns 11, 12, 13, and 14 and columns 11 and 12 support the yoke 15 and columns 13 and 14 support yoke 16 which yokes are held on their respective columns by the nuts 17, 17. Said columns 11 and 12 also support and serve as slideways for the vertically movable supporting yoke 18, and the columns 13 and 14 in like manner support and serve as slideways for the vertically movable yoke 19. The hooks 20 and 21 hinged to yokes 15 and 16 respectively are removably engageable with the notches 22 and 23 on the yokes 18 and 19 for supporting said latter yokes when desired or for limiting the downward movement thereof at certain times. The cams 24 and 25 through their handles 26 and 27 serve to move said hooks 20 and 21 out of engagement with notches 22 and 23. The springs 28, 28 between the yokes 18 and 19 and the nuts 17, 17 serve to limit the upward movement of the yokes 18 and 19 during squeezing and jolting and for imparting a quick downward movement during jolting of molds in flasks supported by yokes 18 and 19 as hereinafter fully described.

In said yokes 18 and 19 and between their respective supporting columns are provided the roller bearings 30 and 31 respectively. In bearing 30 is mounted the journal shaft 32 formed on the end of the supporting member 34 which extends inwardly toward the center of the machine. A ball thrust bearing 36 mounted between yoke 18 and a shoulder on member 34 serves to take any end thrust expected thereon. In bearing 31 is mounted the journal shaft 37 formed on the supporting member 39.

Said support members 34 and 39 serve to carry the cope 40 which is secured thereto by the bolts 41, 41 and the flanges 42 and 43 formed on said cope. On member 34 is mounted the pin 44 which extends upwardly therefrom when the cope is in the inverted position. On said pin is journaled an arm 46 which supports the pattern plate 47. Said arm 46 is movable rotatably and horizontally on said pin 44 on which the head 48 serves to limit the longitudinal movement. Through the flange 42 and support arm 34 and through flange 43 and arm 39 are provided the holes 50 and 51 through which extend the pins 52 and 53 which are fixed to the drag 54 and serve to position it on the pattern plate and cope. The latch 56 serves to hold the cope 40 and drag 54 together when desired.

From the above description it can be seen that the flask and pattern plate are rotatable on a horizontal axis on said bearings 30 and 31. Means for locking the flask in either the normal or the inverted position is provided in the form of a bolt 55 which extends through the hole 57 in yoke 19 and is engageable with hole 59 or 60 in flange 61 on member 39 for holding the flask either in the inverted or the normal position respectively. The handle 62 pivoted at one end to the yoke 19 and having a loose pivot connection with pin 55 serves to move the latter into and out of engagement with said holes 59 and 60.

Directly below the cope 40 and carried by said base 10 is the vertical cylinder 65 in which is movable the piston 66 which carries the molding table 67. Compressed air is supplied to the cylinder 65 through the pipe 69 by way of the valve mechanism 71 which can be regulated to cause the piston to move upwardly for squeezing the mold or for other purposes, or to cause the piston to move upwardly a given distance and then jolt for a given number of jolts as fully described in my copending application Serial No. 66,473, filed November 3, 1925, to which reference is hereby made.

Above the cope or flask is mounted the squeezing head 72 which by means of handle 73 swings rotatably into and out of operable relation with the flask on its journal bearings 74 and 75 which move in the bearings 76 and 77 formed in the standards 78 and 79 formed in said yokes 16 and 15 respectively. On said journals 74 and 75 are mounted the counterweights 80 and 81 diametrically opposite to said head 72.

Mounted to the cope 40 are the clamps 84 which serve to hold the cope, drag, and a bottom board together when the flask is rolled over. For holding the cope mold and cope in an upright position are provided the disengageable holding members 86, 86 operable through the shafts 87, 87 in accordance with my invention disclosed in my copending application Serial No. 33,605, filed May 29, 1925, to which reference is hereby made.

Pivoted to the yoke 18 and movable onto and from the drag is the filling box 88, a similar filling box 89 for the cope being pivoted to yoke 19.

In the use and operation of the above described mold making machine embodying my invention for the forming of a two part mold, the squeezing head 72 being swung out of the way and the cope 40, pattern plate 47, drag 54 and filling box 88 being held up by hooks 20, 21 in the inverted position mold material such as sand is admitted between the squeeze head arms 82 and 83 into the drag and filling box and head 72 is moved into the squeezing position (see Fig. 5). By means of valve mechanism 71 and as described in said copending application Serial No. 66,473 air is admitted to cylinder 65 to cause cylinder 66 automatically first to raise the table 67 to move the flask upwardly to cause the sand to be squeezed by said head 72 and then to jolt it. The table is then lowered, head 72 is swung out of the way, and the drag mold is struck off by moving the filling box 88 from over the flask. A bottom board (not shown) is placed over the drag mold and clamped thereon by means of clamps 84, 84 mounted to cope 40. Bolt 55 is then disengaged from hole 59, by means of handle 62 and the flask is rolled over into the upright position in which it is secured by engaging pin 55 in hole 60. Filling box 89 is then swung into position over cope 40 and sand admitted thereto. After the head 72 is swung into the squeezing position, the table 67 through piston 66 is actuated as before described to squeeze and jolt the cope mold. The clamps 84, 84 are then disengaged and the table lowered leaving the bottom board, drag 54, and the drag mold thereon; leaving the cope suspended and the cope mold held therein by means of the members 86, 86; and leaving the pattern plate 47 suspended between but separated from both the cope mold and the drag mold, the pattern plate having slid on its bearing 46 and pin 44 downwardly after the drag and table but having been prevented from moving as far as they by the pin head 48, the hooks 20, 21 serving of course to hold the cope suspended.

The filling box 89 and pattern plate 47 are then swung out of the way and the table raised to bring the cope and drag together. The cope mold is then released from the holding members 86, 86, the drag attached to the cope by means of latch 56, and the table lowered whereupon the cope and drag molds remain together on the bottom board with which it is removed from the table. In pouring the casting the mold is held together by a mold shell clamped to the bottom board, such a shell being described in my copending application Serial No. 33,606, filed May 29, 1925.

It is to be understood that when the drag mold is formed it is jolted more than is the cope mold so that it will not settle out of shape nor away from the pattern plate when the cope mold is jolted. The process of forming a mold with such varied jolting of the cope and drag molds is described and claimed in my copending application Serial No. 66,473, filed November 3, 1925, of which this application is a continuation in part.

For continuing the mold making process the table is raised to engage the drag which is released from the cope, the table lowered to separate the cope and drag, the pattern plate swung between them, and the cope, pattern plate, and drag reassembled and the process continued as above described.

I claim:

1. In a molding machine, in combination, a cope, a support for said cope with connection therebetween permitting the rolling over of said cope, means on said support for locking said cope in a desired position, standards for said support permitting the raising and lowering of the support thereon, means for locking said support on said standards against downward movement and allowing upward movement from a given point, resilient means for limiting said upward movement, a squeezing head above said cope movable into and out of operable relation with said cope, a lifting and jolting table under said cope, and means under said table for raising and jolting said table and cope.

2. In a mold making machine, in combination, a set of standards, support members on said standards and movable upwardly and downwardly thereon, a cope removably fixed to and held by said supports, resilient means for limiting the upward movement of said supports on said standards, disengageable means for positively limiting the downward movement of said supports on said standards, connection between said cope and said supports permitting the rolling over of said cope, means for locking said cope at desired positions on said supports, and means for jolting said cope against the tension of said resilient means.

3. In a mold making machine, in combination, a set of standards, support members on said standards and vertically movable thereon, resilient means for limiting the upward movement of said supports on said standards, disengageable means for positively limiting the downward movement of said supports beyond a given point, a cope mounted on said supports, a pattern plate mounted on said supports movable vertically and horizontally into and out of operable position on said cope, a drag, means for locking said cope, pattern plate, and drag in predetermined relation, and means for permitting the rolling over of the cope and drag on said supports.

4. In a mold making machine, in combination, a set of standards, support members vertically movable on said standards, resilient means for limiting the movement in an upwardly direction, disengageable means for positively limiting the movement downwardly beyond a given point, a cope mounted for rotational movement on a horizontal axis on said support, a pattern plate mounted on said supports rotatable with said cope but movable vertically and horizontally into and out of operable relation therewith, a drag, means for releasably engaging said cope, drag, and pattern plate at a predetermined relation, and means for jolting said cope, drag, and pattern plate.

5. In a mold making machine, in combination, a set of standards, support members vertically movable on said standards, resilient means for limiting the movement in an upwardly direction, disengageable means for positively limiting the movement downwardly beyond a given point, a cope mounted for rotational movement on a horizontal axis on said support, a pattern plate mounted on said supports rotatable with said cope but movable vertically and horizontally into and out of operable relation therewith, a drag, means for releasably engaging said cope, drag, and pattern plate at a predetermined relation, and means for jolting said cope, drag, and pattern plate against said resilient means.

6. In a mold making machine, in combination, a set of standards, support members vertically movable on said standards, resilient means for limiting the movement in an upwardly direction, disengageable means for positively limiting the movement downwardly beyond a given point, a cope mounted for rotational movement on a horizontal axis on said support, a pattern plate mounted on said supports rotatable with said cope but movable vertically and horizontally into and out of operable relation therewith, a drag, means for releasably engaging said cope, drag, and pattern plate at a predetermined relation, a squeezing head movable into and out of operable relation above said cope and drag, and means for jolting said cope, drag, and pattern plate against said resilient means, and for raising the flask against said squeezing head.

7. In a mold making machine, in combination, a support, a flask section mounted to the support for rotation about a horizontal axis and for movement vertically, and a match plate carried by said support movable with said flask section and adapted further to be moved from against the bottom of the cope and to be moved from against the said bottom with a movement normal to the bottom and then to be moved from registry over said bottom and releasable means on said flask section for holding a mold section therein, a platform below said flask section, and means for raising and lowering it, and a squeeze head mounted for movement into and out of operable relation above said carrying member.

8. In a mold making machine, in combination, a support, a flask section mounted to the support for rotation about a horizontal axis and for movement vertically, and a match plate carried by said support movable with said flask section and adapted further to be moved against the bottom of the cope and to be moved from against the said bottom with a movement normal to the bottom and then to be moved from registry over said bottom, another flask section, a bottom board, and detachable means for securing together said flask sections, pattern board, and bottom board, a platform below said flask section, and means for raising and lowering it and a squeeze head mounted for movement into and out of operable relation above said carrying member.

9. In a mold making machine, in combination, a support, a flask section mounted to the support for rotation about a horizontal axis and for movement vertically, and a match plate carried by said support movable with said flask section and adapted further to be moved from registry over said bottom and releasable means on said flask section for holding a mold section therein, another flask section, a bottom board, and detachable means for securing together said flask sections, pattern board, and bottom board, a releasable latch for holding said flask section at a predetermined height on said support member, a platform below said flask section, and means for raising and lowering it, and a squeeze head mounted for movement into and out of operable relation above said carrying member.

10. In a mold making machine, in combination, a support, a flask section mounted to the support for rotation about a horizontal axis and for movement vertically, and a match plate carried by said support movable with said flask section and adapted further to be moved against the bottom of the cope and to be moved from against the said bottom with a movement normal to the bottom and then to be moved from registry over said bottom, another flask section, a bottom board, and detachable means for securing together said flask sections, pattern board, and bottom board, a releasable latch for holding said flask section at a predetermined height on said support member and a releasable latch having means for holding said flask section in an upright position and in an inverted position, a platform below said flask section, and means for raising and lowering it.

11. In a mold making machine, in combination, a support, a flask section mounted to the support for rotation about a horizontal axis and for movement vertically, and a match plate carried by said support movable with said flask section and adapted further to be moved against the bottom of the cope and to be moved from against the said bottom with a movement normal to the bottom and then to be moved from registry over said bottom, another flask section, a bottom board, and detachable means for securing together said flask sections, pattern board, and bottom board, a releasable latch for holding said flask section at a predetermined height on said support member, and a releasable latch having means for holding said flask section in an upright position and in an inverted position, a platform below said flask section, and means for raising and lowering it and a squeeze head mounted for movement into and out of operable relation above said carrying member.

In testimony whereof I hereto affix my signature.

JOHN R. WOOD.